(No Model.)
W. C. AYRES.
NUT LOCK.
No. 452,511. Patented May 19, 1891.
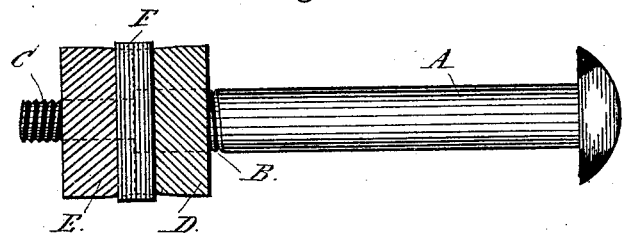
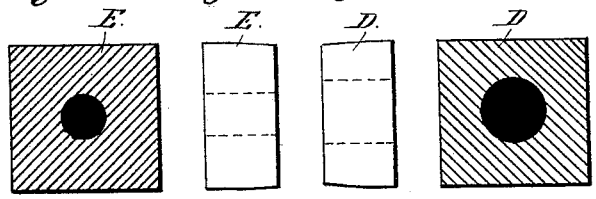
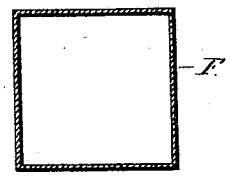
WITNESSES
INVENTOR
William C. Ayres.
Attorney

UNITED STATES PATENT OFFICE.

WILLIAM C. AYRES, OF NEW ORLEANS, LOUISIANA, ASSIGNOR OF ONE-HALF TO LOUIS HOLT JUREY, OF SAME PLACE.

NUT-LOCK.

SPECIFICATION forming part of Letters Patent No. 452,511, dated May 19, 1891.

Application filed December 11, 1890. Serial No. 374,317. (No model.)

*To all whom it may concern:*

Be it known that I, WILLIAM COOK AYRES, a citizen of the United States, residing at New Orleans, in the parish of Orleans and State of Louisiana, have invented certain new and useful Improvements in Nut-Locks; and I do declare the following to be a full, clear, and exact description of the invention, such as will enable others skilled in the art to which it appertains to make and use the same.

My invention relates to an improvement in a nut-lock in which two nuts are made to operate in conjunction with a rectangular or other shaped key or band; and the objects of my invention are to provide a secure fastening for a nut upon shafting, machinery, agricultural implements, vehicles, railway-tracks, bridge-timber, or other places where a secure fastening for a nut is required. I attain these objects by the mechanism illustrated in the accompanying drawings, in which—

Figure 1 is a side view with nuts and band in position. Fig. 2 is a side view of bolt with nuts and band detached. Fig. 3 is a front view of left-handed nut. Fig. 4 is a side view of left-handed nut. Fig. 5 is a side view of right-handed nut. Fig. 6 is a front view of right-handed nut. Fig. 7 is a front view of band or key. Fig. 8 is a side view of band or key.

Similar letters refer to similar parts throughout the several views.

In the drawings, A refers to a bolt, which may be of any desired size, having threaded ends, as shown by B and C, one of said threads being so constructed as to permit a nut to be screwed on from the right while the other permits a nut to be screwed on from the left, B designating a thread, which I term my "right-handed thread," and C showing a thread which I term my "left-hand thread." D and E represent nuts, which may be of any desired form, and are slightly beveled on one end, the beveled ends being joined when nuts are in position, F showing a rectangular band or key, which when in position, as shown in Fig. 1, takes up the slack between the two nuts. Thus should nut D be moved slightly in the direction of nut E the band or key F is forced tightly against the nut E and holds same in a rigid position, and should nut E be moved slightly band or key F is forced against nut D and holds same in a secure position, and in this manner prevents either nut from being removed from off the bolt by jarring. In placing my nuts in position the nut D is first screwed on the bolt A, the key or band F is then driven on nut D, then screw on the nut E until it forms a jam with nut D, then drive key or band F slightly toward you so as to cover beveled end of nut E. In removing the nuts the band or key F is driven upon the beveled edge of nut D, which releases nut E, and can be detached from bolt A. Band or key F can also be removed, and nut D removed by simply unscrewing same from bolt.

Having described my invention, what I claim, and desire to secure by Letters Patent, is—

In a nut-lock such as described, a bolt having its end threaded in a reverse manner to receive nuts, in combination with two nuts having their ends beveled, and a band or key F, embracing the nuts and forming a lock, said band being narrower than the combined depth of the two nuts, substantially as described.

In testimony whereof I affix my signature in presence of two witnesses.

WILLIAM C. AYRES.

Witnesses:
 GEORGE EDGETT,
 PERCY D. PARKS.